Aug. 25, 1959    B. A. HARRIS    2,901,546

LINE FINDER AND ALLOTTER SYSTEM

Filed Dec. 12, 1955    5 Sheets-Sheet 1

INVENTOR.
BEN A. HARRIS

BY Henry H. Gage
AGENT

Aug. 25, 1959 B. A. HARRIS 2,901,546

LINE FINDER AND ALLOTTER SYSTEM

Filed Dec. 12, 1955 5 Sheets-Sheet 2

United States Patent Office 2,901,546

Patented Aug. 25, 1959

2,901,546

LINE FINDER AND ALLOTTER SYSTEM

Ben A. Harris, Rochester, N.Y., assignor to General Dynamics Corporation, a corporation of Delaware Application December 12, 1955, Serial No. 552,360

17 Claims. (Cl. 179—18)

This invention relates generally to automatic telephone systems employing line finders and allotters, and more specifically to line finders and allotters in which switching is accomplished by means other than electromechanical switches.

In a telephone system comprising a plurality of lines and a plurality of selectors arranged so that an incoming call over any one of the lines may be extended over any one of those selectors, it is the practice to provide a line finder individual to each selector to form a communication link. Each line finder has access to all of the lines and is effective for extending a connection between its associated selector and a calling one of the lines. The assignment of finder-selector links is controlled by an allotter common to both the lines and the line finders. The allotter responds to an incoming call condition on any one of the lines to cause an associated one of the line finders of an idle link to operate.

In line finders utilizing pluralities of coordinate switching elements, such as relays, instead of mechanical switches, it has been necessary in the past to provide a so-called lockout circuit between the line circuits and the allotter for the purpose of indicating the identity of a calling line to the line finder, and for preventing calling conditions on more than one line at a time from causing an allotted line finder to attempt to establish a connection to more than one line. Usually such lockout circuits comprise a series of relays having chain contacts arranged so that the operation of any one relay is sufficient to prevent the operation of succeeding relays in the series. Among the disadvantages of such a system, one of the more obvious is that failure of the chain contacts may jeopardize the successful operation of the whole telephone system.

Accordingly, it is an object of my invention to provide a new and improved coordinate element type line feeder.

Another object of my invention is to provide a coordinate element type line finder in which the lockout function is carried out within the line finder itself.

I accomplish these and other objects by providing a telephone system comprising a plurality of lines divided into groups and a plurality of selectors. Each line is terminated in a line circuit. A line finder comprising a series of relays is associated with each selector, the combination of the line finder and selector being hereafter referred to as a line finder-selector link. Means comprising an operated one of the relays is effective for establishing a connection from the selector associated with a particular line finder to a particular one of the lines.

In response to the existence of a calling condition on any one of the lines, means comprising a relay within the corresponding line circuit is operated. Means responsive to the operation of the line relay in any one of the line circuits is effective for causing an allotter circuit common to both the group of line circuits and the line finder-selector links to prepare the operating circuits of all of the finder relays within an idle one of the links. Thereafter, means comprising contacts on the calling line relay closed in response to the operation of that relay is effective for completing a calling line identifying circuit which is unique to the calling line. The calling line identity circuit comprises one of a plurality of conductors unique to the group of lines containing the calling line which extends to the above mentioned preparing means. The preparing means is effective for interconnecting each of the group identifying conductors to the corresponding operating circuit within the idle line finder. Thereupon the line identification circuit completes the operating circuit of the relay corresponding to the group of lines containing the calling line.

The operating circuit of any relay within the series of line finder relays is effective for placing the winding of the relay to be operated in series with an energy source such as a battery. The battery is connected to one side of the winding of each series relay by means comprising contacts on each relay in the series arranged in a chain. These contacts are effective in response to the operation of any one of the series of relays for opening the operating circuit of all succeeding relays in the series. Thus in the event that a simultaneous calling condition is placed on more than one line, the series relay corresponding to the group of the calling line and which is closer to the head of the series is operated to the exclusion of the succeeding relay within the series corresponding to the group of the other calling line.

Further objects and advantages of my invention will become apparent as the following description proceeds, and the features of novelty which characterize it will be pointed out with particularity in the claims annexed to and forming a part of this specification. For a better understandnig of my invention, reference may be had to the accompanying drawings in which:

Figure 1:
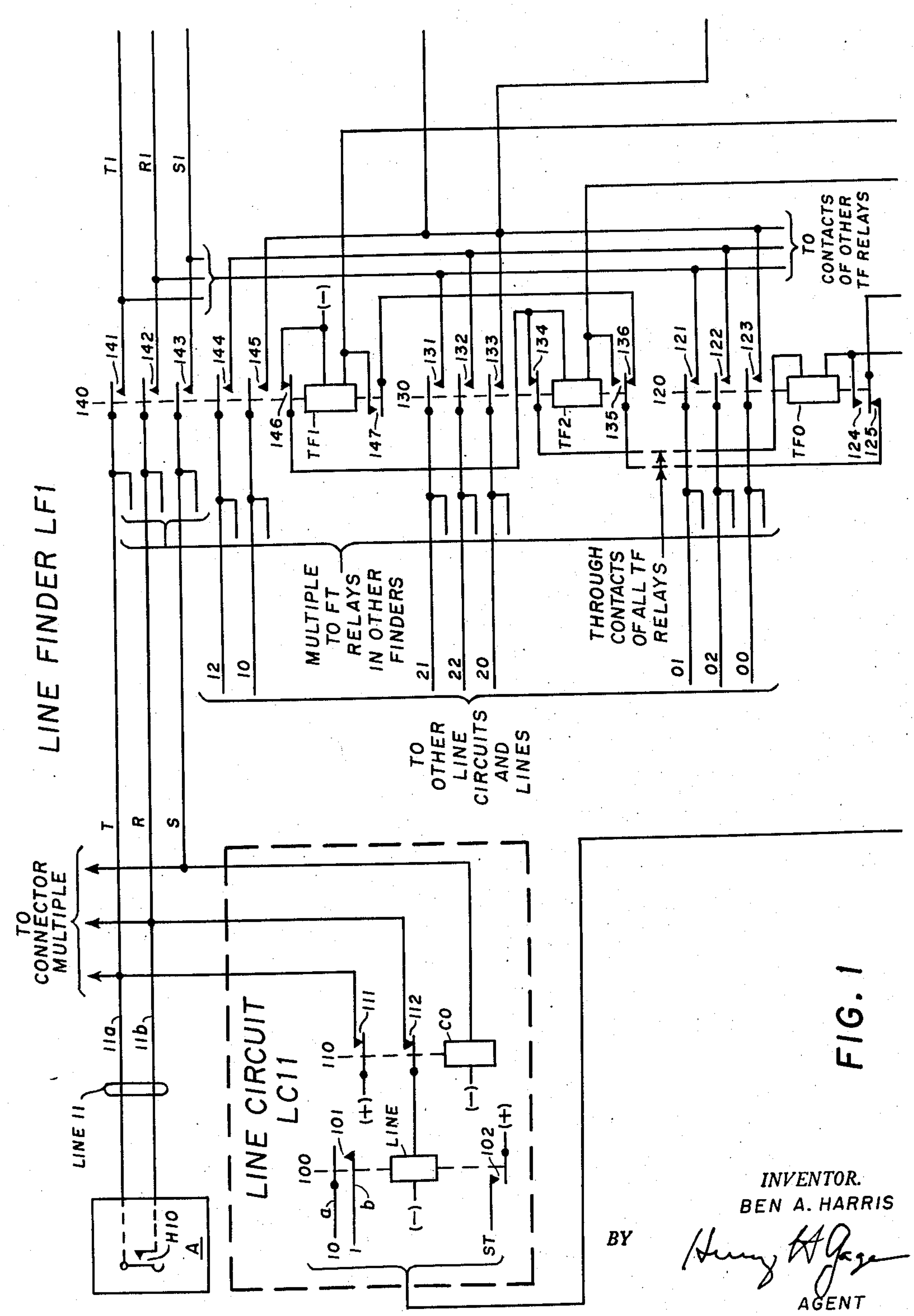
Fig. 1 shows a subscriber line and line circuit as well as a part of an all-relay line finder.
Figure 2:
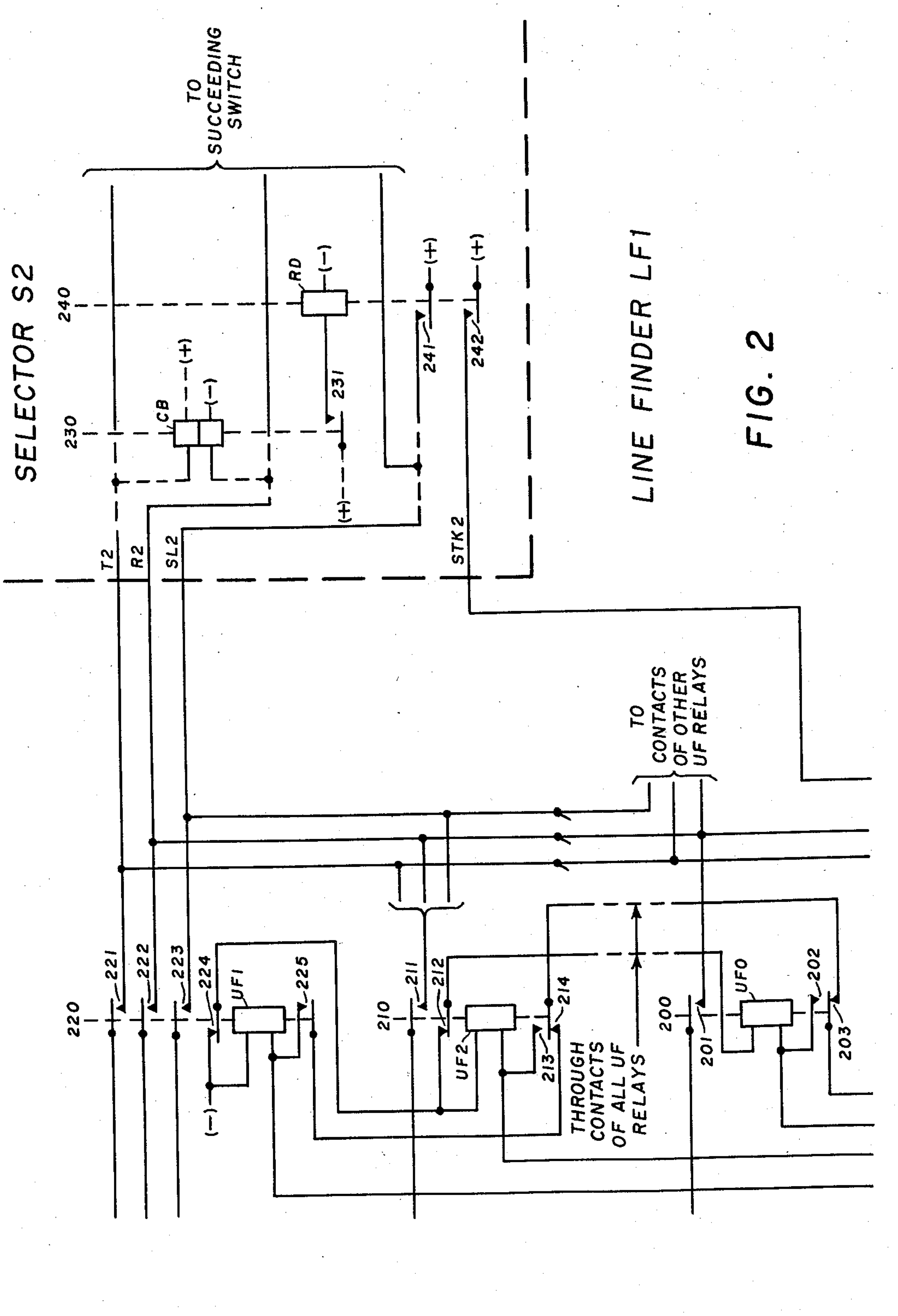
Fig. 2 shows the remainder of the line finder referred to in Fig. 1 as well as a skeletonized representation of a selector associated with the line finder.

The apparatus which forms the embodiment of this invention is made to function from a source of power such as a battery. The most positive plate or terminal of the battery is connected to ground and is hereinafter referred to as "ground" and in the drawings as (+). The most negative, ungrounded terminal or plate of the battery is hereinafter referred to as "battery" and in the drawings as (−).

*Incoming call on a line*

Referring to Fig. 1, in a telephone system including a plurality of lines such as line 11, a calling condition may be imposed on any one of the lines by the well known expedient of closing hookswitch contacts such as H10 at station A on line 11. The closure of the station hookswitch contacts is effective for creating a calling condition in the line circuit, such as LC11, in which each of the plurality of lines is individually terminated by completing an operating circuit for the line relay of the terminating circuit. In the case of line 11, this operating circuit for line relay 100 is traced as follows: from ground through break contacts 111, conductor 11*a* of the line, now closed hookswitch contacts H10 at station A, conductor 11*b* of the line, break contacts 112 and the winding of relay 100 to battery. Relay 100 thereupon operates,

*Allotter operation*

In addition to the above referred to plurality of lines and line circuits, the contemplated telephone system also includes a plurality of selectors, such as S2, which are used for extending connections from calling ones of the plurality of lines. Individually associated with one of the selectors is a line finder, such as LF1. The line finders are effective for extending connections from calling ones of the plurality of lines to the associated selectors. An allotter common to the line circuits and line finders is effective for assigning for use in extending a call an idle link in response to the imposition of a calling condition on an incoming line. The operation of the allotter is next described.

Figure 3:
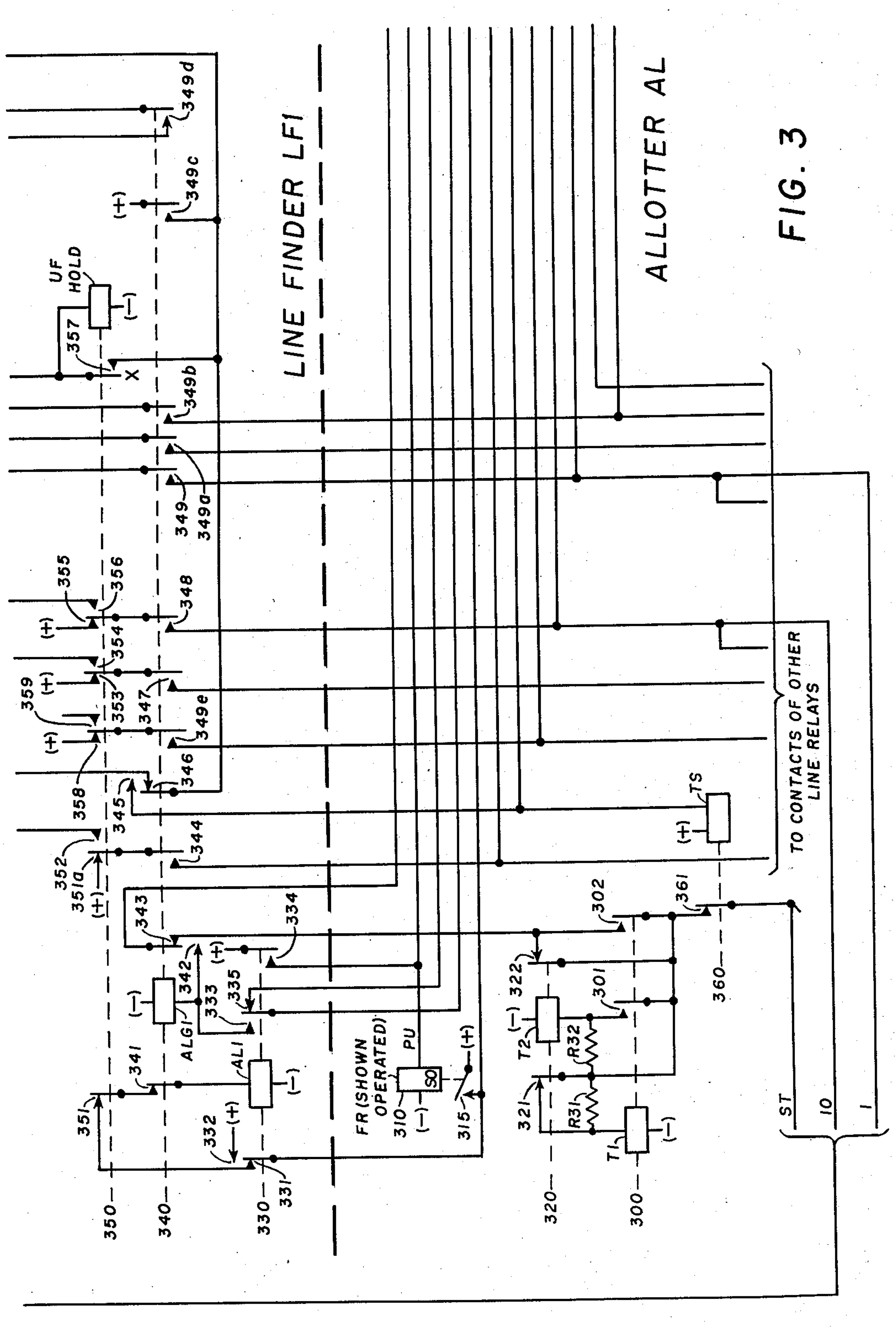
Figs. 3 and 4 show an allotter common to a group of line finder-selector links.
Figure 4:
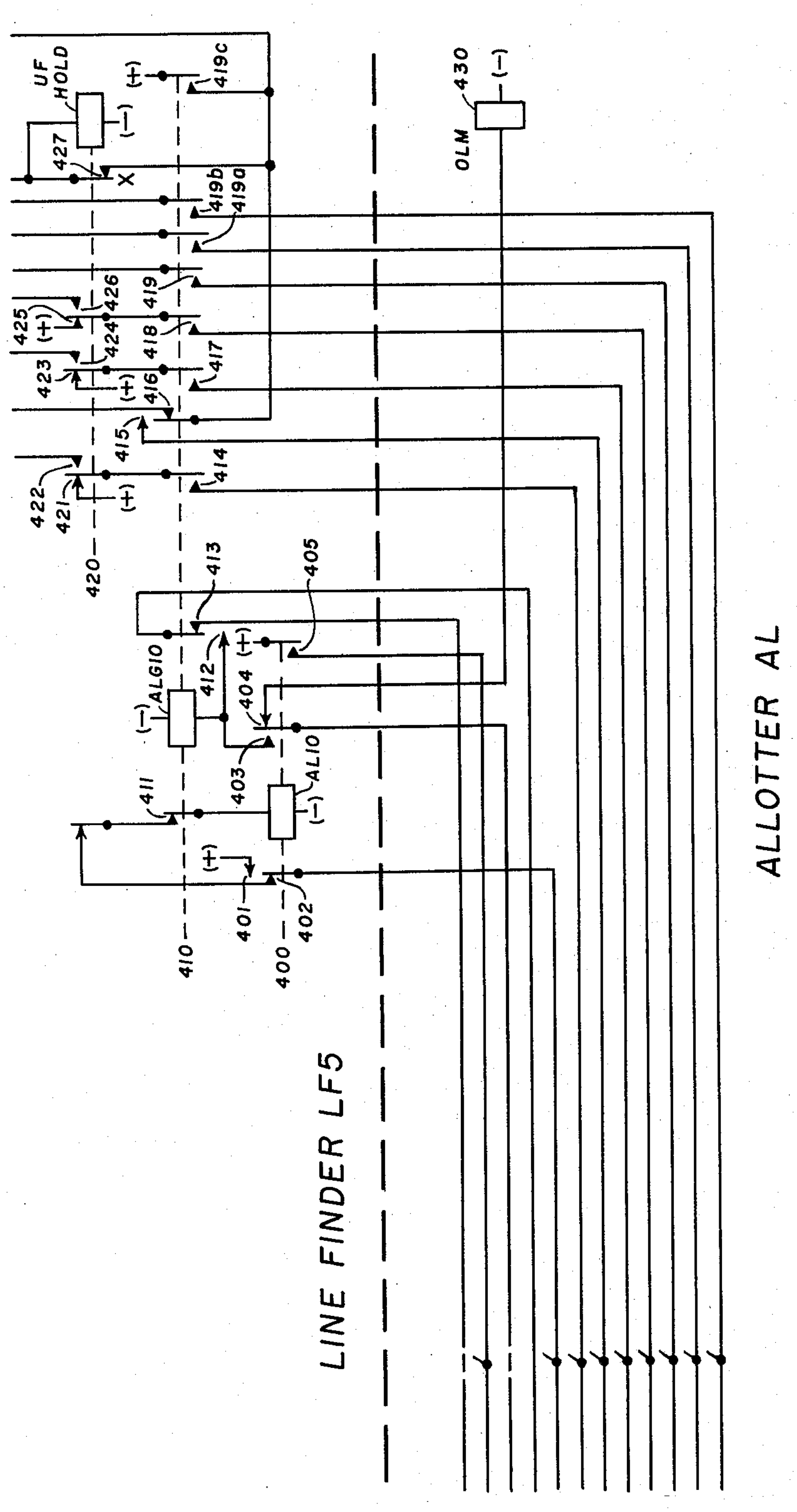
Figures 5, 6:
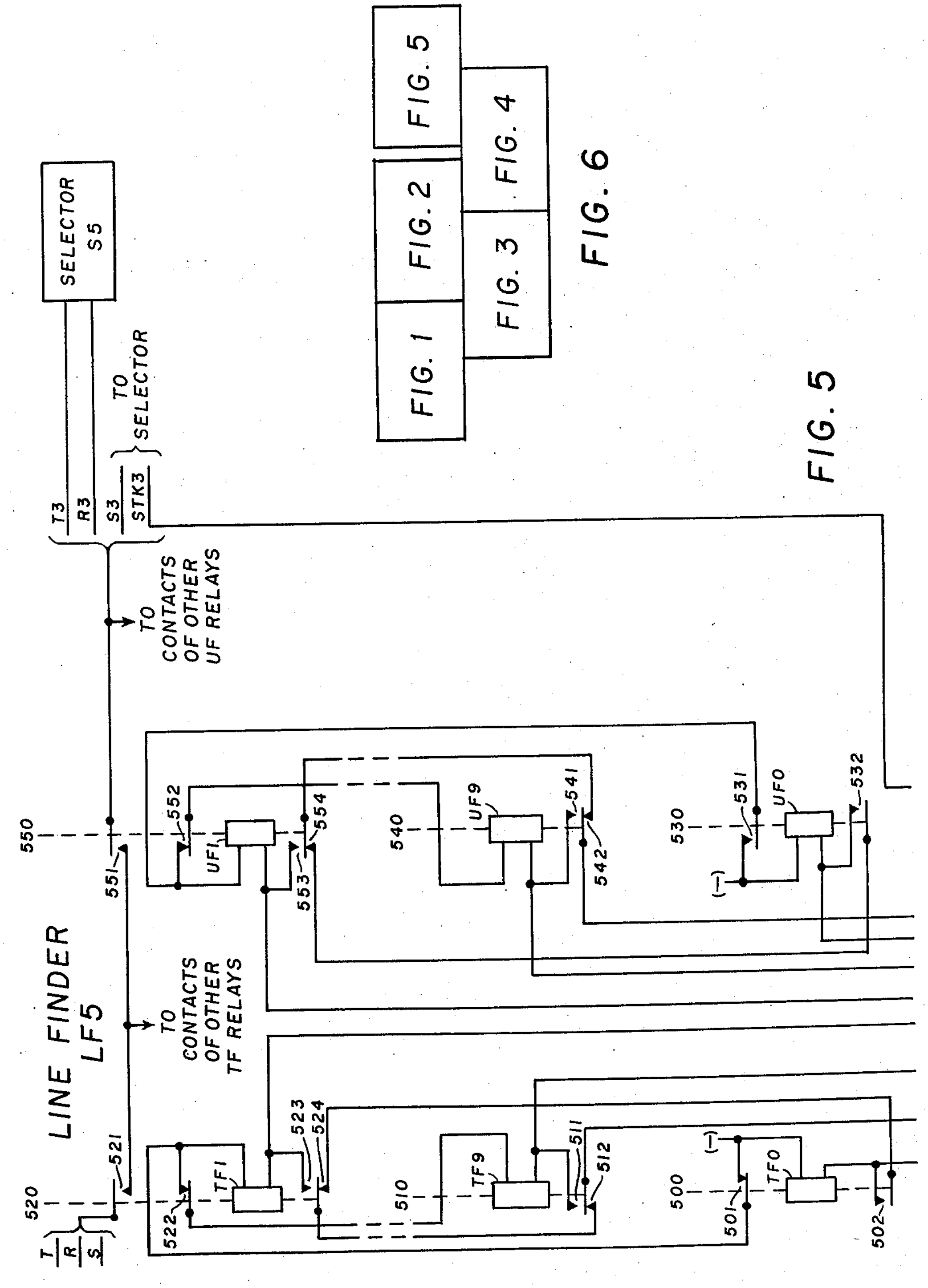
Fig. 5 shows in skeletonized form another finder-selector link.
Fig. 6 shows the manner in which Figs. 1 to 5 should be arranged.

Referring to Figs. 3 and 4, the allotter includes a series of groups of relays, such as first allotter relay 330 and allotter gang relay 340. Each such group of relays is associated with one of the finder circuits. Thus relays 330 and 340 are associated with the line finder LF1, while relays 400 and 410 are associated with line finder LF5. The line finders are arranged in a series, the position of any one finder within the series being determined by the position of its associated group of allotter relays within the series of allotter relay groups. Thus in the system being described here, line finder LF1 is the first and line finder LF5 is the last within the series of line finders.

In addition to its function of assigning idle line finder-selector links for use, the allotter has the function of assigning the links in rotation from first to last in the series of links. The allotter is designed to skip over links which are busy, i.e., already in use. When all the finders, such as LF1 and LF5, are in their normal, unbusy condition and have not been previously allotted for use, all the allotter relays, such as 330 and 400, are maintained operated and all the gang relays, such as 340 and 410, are in their released or normal condition. Relay 330 which is representative of the operated relays has a holding circuit which is traced as follows: from ground through make contacts 332, break contacts 351 and 341 and the winding of relay 330 to battery. As the finder associated with each group of allotter relays is taken for use and therefore becomes busy, the associated allotter relay is released with effects that are to be explained as this description proceeds.

Returning to Fig. 1, the operation of a line relay such as 100 is effective for placing ground on the common start conductor ST in order to operate the gang relay associated with the first idle line finder in the series. Assuming that line finder LF1 is in idle condition, the circuit is traced as follows: from ground through make contacts 102, conductor ST, break contacts 361 and 322, break contacts 343 on gang relay 340, through corresponding break contacts on all other gang relays, such as 413 on relay 410, make contact 333 and the winding of relay 340 to battery. Relay 340 thereupon operates.

The operation of a gang relay is effective for extending connection from calling line identifying circuits to be described presently to the individual line finder associated with the operated gang relay, and for releasing its associated allotter relay by opening the latter's locking circuit. In the case being considered here, the line finder LF1 is associated with relay 340; the operation of relay 340 is effective for releasing relay 330 by opening the above traced locking circuit at break contacts 341.

*Calling line identification*

In the contemplated telephone system, the plurality of lines and line circuits are divided into groups, each group is further divided into subgroups. Each group and subgroup is assigned a number so that any line may be identified by a unique designation. Thus in the case under consideration, line 11 and line circuit LC11 are in Group 1, Subgroup 1. The line relays of each line circuit, such as 100, is provided with a pair of line identifying contacts, such as 101. One of these contacts, such as *a*, is used for identifying the group of the calling line; thus, in the case chosen for discussion, contact *a* of contact set 101 on line relay 100 indicates that the calling line is in the first group. Contact *a* is multiply connected by one of a plurality of group identifying conductors, such as 10, to other corresponding contacts of line relays within the same group. Similarly, the other contact such as *b* of contact set 101 on line relay 100 is used for indicating the identity of the subgroup of a calling line. Contacts corresponding to *b* of set 101 are multiply connected by one of a plurality of subgroup identifying conductors such as 1 to corresponding contacts in all other line relays having the same subgroup designation.

The connection of one of the group conductors to one of the subgroup conductors is effective for establishing a unique calling line identification circuit extending between the line circuit of the calling line and the contacts of the gang relays. Thus it is seen that the concurrent operation of any line relay and any gang relay is effective for extending the calling line identifying circuit into the line finder associated with the operated gang relay. In the case chosen for discussion here, the calling line identifying circuit may be traced from make contact 349 through subgroup identifying conductor 1, contacts *b* and *a*, group identifying conductor 10 and make contact 348.

The operation of gang relay 340 is also effective for seizing selector S2 associated with the assigned line finder circuit LF1 by closing make contacts 349*d*. The latter contacts are bridged across conductors T2 and R2 of selector S2, thereby completing a preliminary operating circuit for calling bridge relay 230. The operation of relay 230 is effective for operating release delay relay 240 by closing an obvious operating circuit for the latter relay at make contacts 231. The operation of relay 240 is effective for connecting holding ground to sleeve conductor SL2 and to conductor STK2 at make contacts 241 and 242, respectively.

*Operation of the line finder*

Line finders such as LF1 and LF5 are provided for extending connections from a calling one of the plurality of lines to associated selectors such as S2 and S5, respectively. Referring to line finder LF1, each line finder comprises a first group of finder units relays, such as 200 through 220, inclusive, and the second group of finder tens relays, such as 120 through 140, inclusive. Each relay within the first and second groups corresponds to one one of the subgroups and groups, respectively, of the plurality of lines and line circuits. Each group of finder relays is arranged in a series. The operation of any one of the finder units relays is effective for selecting the units subgroup of a calling line and for partially extending a connection from the selector associated with the line finder to the calling line. For convenience, finder units relays are arranged so that they have a designation digit identical to the subgroup designation of the calling line. Thus in the case under consideration, operation of the first finder units relay is effective for partially extending a connection from selector S2 to all the lines having the designation ending in the digit 1 including line 11.

Referring to the group of finder tens relays, each relay in the finder tens group is effective in combination with one of the finder units relays for completing a connection between the group of lines containing the calling line and the selector associated with the line finder. For convenience, the unit designation of each finder tens relay is chosen so that it corresponds to the group designation of the calling line to which the line finder has access. Thus in the case chosen for illustration, the operation of the finder tens relay 140 is effective in combination with operated finder units relay 220 of line finder LF1 for extending a connection from line 11 to selector S2. The manner in which the relays of these two series are selectively operated in response to the creation of a calling condition on any one of the lines to which the finder has access is next described.

In the description thus far, it has been demonstrated how the creation of a calling condition on any one of the lines in which the line finder has access is effective for creating a unique calling line identifying circuit by closing calling line identification contacts, such as 101. It has further been pointed out how the operation of a gang relay, such as 340, is effective for extending this line identification circuit from one point such as make contacts 349 to another point such as make contacts 348 within an assigned line finder circuit such as LF1. It will now be shown how this unique calling line identification circuit is used for selectively operating the subgroup and the group relays which are effective for establishing a connection between a calling line such as 11 and the selector such as S2 associated with an assigned line finder such as LF1.

Each of the group and subgroup relays within the line finder is provided with an individual operating circuit. Means comprising an operated allotter gang relay, such as 340, is effective for preparing the operating circuits of all the group and subgroup relays by interconnecting the operating circuits of the first series of relays to the subgroup identifying conductors at make contacts, such as 349, **349*a* and 349*b*, and the operating circuits of the second series of relays to the group identifying conductors at contacts such as 344, 346 and 347. Of this plurality of prepared circuits, the only one to be completed is the one which is included in the above described calling line identification circuit. Thus in the case being considered here, the operation of relay 340 and the operation of line relay 100 is effective for completing an operating circuit for units finder relay 220 which is traced as follows: from battery through the winding of relay 220, make contacts 349, subgroup identification conductor 1, make contacts 101, group identification conductor 10, make contacts 348 and break contacts 355 to ground. Relay 220** thereupon operates.

In response to the operation of any one of the units finder relays, means comprising hold relay 350 is operated. This operating circuit may be traced from the ground connection supplied over the calling line identification circuit to the winding of relay 220, through make contact 225, break contacts 214 and 203, and the winding of relay 350 to battery. Relay 350 thereupon operates. The operation of relay 350 is effective for carrying out several functions. The first of these is to mark the end of the finder units relay operation by opening the ground connection to the tens identification conductors at contacts such as 353, 355 and 357. The operation of relay 350 is also effective for further extending the operating circuits of the second group (tens finders) relays to the tens identifying conductors at make contacts such as 354, 356 and 358. The operation of relay 350 is effective to extend a holding ground for relay 350 from the STK2 conductor through make contact 357 to the winding of relay 350; ground from the same source is extended through break contacts such as 203 and 214 on unoperated ones of the units finder relays and make contacts such as 225 on the operated one of the units finder relays for the purpose of holding the latter relay operated.

The operation of holding relay 350 is effective for transferring the calling line identifying circuit from its previously described connection to the units finder relays to the tens finder relays. Accordingly, the line identifying circuit completes the operating circuit of the tens group relay corresponding to the designation of the calling line. In the case chosen for consideration here, this circuit is traced as follows: from ground on the STK2 conductor, through make contacts 357, break contacts 203 and 214, make contacts 225 and 349, make contacts 101 of the line identifying circuit, make contacts 348 and 356 and the winding of tens finder relay 140 to battery. Relay 140 thereupon operates.

The operation of relay 140 is effective for establishing a holding circuit for itself which is traced as follows: from battery through the winding of relay 140, make contacts 147, break contacts 136 and 125, make contacts 345, and the winding of relay 360 to ground. When the above described ground connection for operating the tens relay is removed, by a process to be described presently, current flowing through the holding circuit is effective for holding relay 140 and for operaitng relay 360.

In the event that there is a calling condition on more than one line, the operation of relay 360 is effective for opening the previously described operating circuit comprising conductor ST for the currently operated gang relay such as 340 at break contacts 361. Relay 340 thereupon releases. The release of gang relay 340 is effective for opening the extended connections between the units and tens identification conductors and the line finder by opening make contacts such as **346–349*b*, inclusive. The release of relay 340 is also effective for transferring the holding circuit for relay 140 from its previously described connection to the winding of relay 360 to the ground supplied over conductor STK2 by opening make contacts 345 and closing break contacts 346. Owing to the make-before-break nature of contacts 345 and 346, this transfer is effective without interruption of the holding circuit for relay 140, so that the latter is maintained steadily in its operated condition throughout the release of relay 340. The opening of the circuit of relay 360 causes the latter to release and to recomplete the previously described connection between common start conductor ST and the chain contacts on the series of allotter gang relays such as 340 and 410. The release of relay 360** and the currently operated gang relay marks the end of the allotting process. Thereafter, the allotter is freed to assign the line finder associated with the next operated allotter relay in the series of allotters.

*Extension of a connection from a calling line to a selector.*—Returning to the consideration of the groups of relays within the line finder, the operation of one relay in each of the groups of relays, such as 140 and 220, is effective for extending a connection from conductors T2, R2 and SL2 of the link selector such as S2 to the multiple of the calling line circuit such as LC1 comprising conductors T, R, and S, respectively. As a result, ground placed on conductor ST is etxended through make contacts 223 and 143 and the winding of cut-off relay 110 to battery. Relay 110 thereupon operates. The operation of relay 110 is effective for removing the previously traced connection of ground and battery through the winding of relay 100 to calling line 11 at break contacts 111 and 112. Relay 100 thereupon releases, removing from the common start conductor ST the operating ground for energizing the allotter gang relays, such as 340. The release of relay 100 is also effective for opening the previously described line identifying connection by opening make contacts 101 thus removing ground from the finder tens relay winding. The removal of ground from the finder tens relay winding makes the previously traced holding circuit including relay 360 effective.

The operation of relays 140 and 220 is effective for completing a circuit for controlling the calling bridge relay 230 in selector S2. This circuit is traced as follows: from ground through the upper winding of relay 230, conductor T2, make contacts 221, conductor T1, make contacts 141, conductor T, conductor **11*a*, the hookswitch contact H10, station A, conductor 11*b*, conductor R, make contacts 142, conductor R1, make contacts 222, conductor R2, and the lower winding of relay 230 to battery. Upon the establishment of this connection, the control of the operation of relay 230 is under the hookswitch contacts H10 of station A and the well known dialing apparatus, not shown, at station A. Thus the control of the release delay relay 240 is transferred from the previously described bridging contacts 349*d*** to apparatus controlled from the subscriber station A. The subsequent transmission of dial impulses from station A is effective to cause other apparatus in selector S2, which is not shown, to operate in the well known manner for the purpose of advancing selector S2 to establish a connection through the selector to other apparatus in the telephone system. Because the apparatus used in establishing such a connection other than line finder LF1 does not form a part of the present invention, it is not considered to be necessary to describe the function of the selector or the other apparatus in the present description.

Thereafter, ground is passed back from other apparatus under the control of the hookswitch contacts, such as H10, at the subscriber's station, such as A, over conductors SL2 and STK2 for the purpose of holding the line finder in its operated condition and maintaining the lockout relay associated with the calling line circuit, said as 110, in its operated condition. Relays 230 and 240 are released during the extension of the call.

*Release of the link.*—At the conclusion of the call, hookswitch contacts at the calling station, such as H10 at station A, are opened for the purpose of releasing the previously described other apparatus in the well known manner, and thereby removing ground from the conductors STK2 and SL2. The removal of ground from conductor STK2 is effective for opening the previously described holding circuits for the operated relays in the first and second groups of line finder relays as well as the finder hold relay 350. The release of the relays in the first and second groups is effective for disabling the connection between the calling line and the selector associated with the line finder. In the present case, the release of relays 220 and 140 is effective to open at contacts 221, 222, 141 and 142 the connection between station A and line 11 and selector S2. The release of hold relay 350 is effective for re-establishing the operating circuit for an allotter relay, such as 330, at break contacts 351 in order to allow the reoperation of the allotter relay after all the line finders in this series of line finders have been allotted for use.

After all line finders in this series have been assigned for use, the fact is indicated by the release of the allotter and gang relays associated with each of the series of finders. Accordingly, ground is removed from the common pickup lead PU of the allotter by the opening of all contacts such as contacts 334 on allotter relay 330 and contacts 405 on allotter relay 400. Finder reset relay 310 which is normally operated from ground supplied through such make contacts on the allotter relays thereupon releases in order to reoperate the allotter relays associated with line finders which have since become idle. It is to be recalled that an idle condition within a line finder which has been assigned for use is indicated by the release of allotter, gang and hold relays associated with that allotter. Accordingly, a circuit is recompleted for operating the allotter relays of idle finders. In the case of line finder LF1, this circuit is traced from ground through break contacts 315, 331, 351 and 341 and the winding of allotter relay 330 to battery. Relay 330 and all other allotter relays in idle allotters thereupon operate and establish the previously described holding circuits from ground supplied through make contacts such as 332. The reoperation of any idle finder in the series of finders is effective for re-establishing the operating ground from make contacts such as 334 to the pickup lead PU for reoperating finder reset relay 310. The presence of an idle finder therefore is effective to reoperate relay 310 to reopen the reset ground source comprising contacts 315.

*Simultaneous calling conditions on different lines.*—In the case considered thus far, it has been assumed that a calling condition exists on one line only. However, when a calling condition exists on more than one line within the group of lines to which the line finder, such as LF1, has access, the line finder is arranged to give priority to one of the lines, i.e., to prevent the line finder from establishing a connection between its associated selector and any calling line other than the one having the highest priority.

To this end, each group of line finder relays is arranged in a series. Thus, in line finder LF2 the units finder relays are arranged so that relay 220 is the first or at the head of the series and relay 200 is the last. Similarly, tens finder relay 140 is the first in the series of second group relays and tens finder relay 120 is the last. The priority system is arranged so that in the event simultaneous calling conditions exist on more than one line where the units designation of the calling lines are unlike, the line having the units designation which corresponds to the first group line finder relay closest to the head of the series is given precedence over the other calling lines. This is arranged by supplying the battery to the operating circuits of each of the series relays through a chain of break contacts, such as 224 and 212. The chain is arranged so that the operation of any one of the series of relays is effective for opening the connection between the battery and the windings of all succeeding relays in the series.

Thus, in the event that a calling condition exists on a line having the units designation 1, such as line 11, and on a different line having a higher units designation, such as line 22 (not shown), the allotter shown in Figs. 3 and 4 is effective in the previously described manner to assign an idle line finder to the incoming calls. Assuming that line finder LF1 has been assigned, concurrent calling line identifying circuits are connected into the operating circuits of the first group of line finder relays in the previously described manner. An operating circuit for relay 220 is thereby completed and relay 220 is operated as described in the above paragraphs. Similarly, an attempt is made to operate the units finder relay 210. However, the operation of relay 220 which is the first in the series of units finder relays is effective at break contacts 224 for opening the battery supply to the winding of relay 210. Therefore, relay 210 cannot be operated at this time. The operation of line finder LF1 thereafter proceeds in the previously described manner to operate the tens finder relay within the second group of line finder relays which corresponds to the line having the higher priority units designation in the previously described manner.

After the one of the second group line finder relays is operated, the tens selection marking relay 360 is operated in the previously described manner for the purpose of opening the connection between the common start ground conductor which is still energized by the presence of ground supplied through contacts corresponding to 102 on the line circuit associated with line 22. The gang relay 340 thereupon releases. Thereafter, the release of relay 360 and the pair of allotter relays 330 and 340 associated with line finder LF1 is effective for transferring the ground connection from the common start conductor ST into the gang relay associated with the next idle line finder in the series of line finders. The next highest priority line then takes precedence in the succeeding line finder in the above described manner.

In the event that calling conditions exist on more than one line having identical units (subgroups) designations, the second group of line finder relays is provided with a chain circuit for connecting battery to the windings of the relays within the series in a manner similar to that described in the case of the first group of relays. Thus, the line having a tens designation which corresponds to the relay closest to the head of the series of tens finder relays is given precedence over other lines having group designations corresponding to succeeding tens finder relays in the series.

My arrangement of providing the first and second groups of line finder relays with the above described priority system has the further advantage that it is possible by using this system to change the priority granted to any given line within the system from one finder to the next. This may be accomplished by arranging the first and second groups of relays in each finder in such a manner that the priority establishing series described above starts with a different units finder and a tens finder relay in each line finder. Thus in the case of line finder LF1, just described, the unit 1 and ten finder 1 relays 220 and 140, respectively, were the point at which the series of subgroup and group relays started. In the case of line finder LF5, the series starts with the unit finder 0 and ten finder 0 relays 530 and 500, respectively, and the chain circuit for the first group of relays within line finder LF5 comprising break contacts 521 and 512 is extended through so that unit finder 9 relay grants lowest priority to the lines having the units designation corresponding to relay 540. Similarly, the second group of relays comprises a series starting with tens finder 0 relay and the chain circuit comprising break contacts 501 and 522 extends through the group of relays and is arranged to grant the lowest priority to lines having the tens designation corresponding to tens finder 9 relay 510.

While I have shown and described the preferred embodiment of my invention, other modifications will readily occur to those skilled in the art without departing from the spirit of my invention. I, therefore, aim in the appended claims to cover all such changes and modifications which wall within the spirit and scope of my invention.

What is claimed is:

1. In a telephone system, a line terminating in a line circuit, a link comprising a line finder and a selector, said line finder comprising a first and a second element, operating circuits individual to each of said elements, means comprising a circuit common to said elements for completing said operating circuits, means in said line circuit operative in response to the existence of a calling condition on said line for rendering said common circuit operative, means for preparing said operating circuits, other means in said line circuit operative in response to the existence of a calling condition on said line for operating said preparing means, means in said line finder operative in response to the operation of said preparing means for rendering said common means operative to complete said first element operating circuit, and means operative in response to the operation of said first element for causing said common means to complete said second element operating circuit.

2. The system set forth in claim 1 having in addition means for preparing said operating circuits, other means in said line circuits operative in response to the existence of a calling condition on said line for operating said preparing means, means in said line finder operative in response to the operation of said preparing means for rendering said common means operative to complete said first element operating circuit, and means operative in response to the operation of said first element and to the operation of said preparing means for causing said common means to complete said second element operating circuit.

3. In a telephone system, a line, a circuit for terminating said line, a plurality of links having busy and idle conditions, each of said links comprising a line finder and a selector, each of said line finders comprising first and second elements for extending a connection from the corresponding one of said selectors to said line, an operating circuit individual to each of said elements, means common to said line finders for completing said operating circuit within any one of said line finders, means individual to each of said line finders for interconnecting the corresponding one of said operating circuits to said common means, means for preparing said interconnecting means of an idle one of said line finders for operation, means in said line circuit operative in response to the existence of a calling condition on said line for operating the prepared one of said interconnecting means, said line circuit means also being operative in response to the existence of a condition on said line for rendering said common means operative, and means operative in response to the operation of said preparing means of an idle one of said line finders for rendering said common means operative to complete said first element operating circuit within the corresponding one of said line finders and means within an idle one of said line finders operative in response to the operation of the corresponding one of said first elements for causing said common means to complete the corresponding one of said second element operating circuits.

4. The system set forth in claim 3 wherein said line circuit means is also operative in response to the existence of a calling condition on said line for rendering said common means operative, and having in addition means operative in response to the operation of said preparing means of an idle one of said line finders for rendering said common means operative to complete said first element operating circuit within the same line finder, and means within an idle one of said line finders operative in response to the operation of its said first element and to the operation of its said preparing means for causing said common means to complete said second element operating circuit within the same idle line finder.

5. In a telephone system, a plurality of lines, a corresponding plurality of circuits for individually terminating each of said lines, said lines being divided into groups, a link comprising a line finder and a selector, said line finder comprising a group of elements, each of said elements corresponding to a particular group of lines, means comprising an operated one of said elements for extending a connection from one of said lines in the corresponding said group of lines to said selector, a plurality of operating circuits, each of said circuits being individual to one of said elements and effective for operating the one of said elements to which it corresponds, and means in each of said line circuits operative in response to a calling condition on the corresponding one of said line circuits for completing the one of said operating circuits of the one of said elements corresponding to the one of said groups which includes the calling one of said lines.

6. The system set forth in claim 5 and having in addition means in said line finder for energizing said operating circuits and wherein said operating circuit completing means of each of said line circuits is effective for interconnecting said energizing means in said line finder with the one of said operating circuits of the one of said elements corresponding to the one of said groups which includes the calling one of said lines.

7. The system set forth in claim 6 and having in addition a plurality of conductors, each of said conductors being individual to one of said groups of lines and extending to the circuit completing means of the corresponding groups of line circuits, and means operative in response to a calling condition on any one of said lines for extending connections between each of said operating circuits and the corresponding one of said conductors.

8. The system set forth in claim 5 and having in addition a plurality of conductors, each of said conductors being individual to one of said groups of lines for extending connections from the corresponding one of said circuit completing means, means operative in response to a calling condition on any one of said lines for extending connections between each of said operating circuits and the corresponding one of said conductors, means in said line finder for energizing said operating circuits, said operating circuit completing means of each of said line circuits, means effective for interconnecting said energizing means and said line finder with the one of said conductors corresponding to the one of said groups of lines which includes the calling one of said lines.

9. The system set forth in claim 5 wherein said elements are arranged in series and having in addition means associated with each of said elements operative for preventing the operation of any one of the succeeding ones of said series of elements, whereby a single connection is extended between the one of said lines corresponding to the element closest to the head of said series and said selector in the event a calling condition exists on more than one line at the same time.

10. In a telephone system, a plurality of lines, a corresponding plurality of line circuits for terminating said lines, said lines being divided into groups and subgroups for the purpose of providing each of said lines with a unique designation, a link comprising a line finder and a selector, said line finder comprising first and second groups of elements corresponding to said groups and subgroups of line designations respectively, means comprising an operated one of said elements in each of said groups for extending a connection from the one of said lines having a unique designation to said operated elements to said selector, a plurality of operating circuits, each of said circuits being individual to one of said elements, means in each of said line circuits operative in response to the existence of a calling condition on the corresponding one of said lines for identifying a calling one of said line circuits, means operative in response to the calling condition on any one of said lines for preparing all of said operating circuits, and means comprising said line circuit identifying means of a calling one of said lines thereafter operative for completing a one of said operating circuits of each group of elements corresponding to the designation of the calling one of said lines.

11. The system set forth in claim 10 wherein said operating circuit completing means includes means in said line finder operative in response to the operation of said connection extending means for rendering said first element group operating circuits effective and thereafter operative in response to the operation of any one of said first group elements for rendering only said second group operating circuits effective.

12. The system set forth in claim 10 wherein said elements in each of said groups are arranged in a series and having in addition means associated with each of said elements operative for preventing the operation of any succeeding element in the same series.

13. The system set forth in claim 10 wherein said operating circuit completing means includes means in said line finder operative in response to the operation of said connection extending means for rendering only said first element group operating circuits effective and thereafter operative in response to the operation of any one of said first group elements for rendering only said second group operating circuits effective, said elements in each of said groups being arranged in a series and having in addition means associated with each of said elements operative for preventing the operation of any succeeding element in the same series.

14. In a telephone system, a plurality of lines, a corresponding plurality of line circuits for individually terminating each of said lines, said plurality of lines and line circuits being divided into groups and subgroups for the purpose of providing each of said lines with a unique designation, a link comprising a line finder and a selector, said line finder comprising a first group and a second group of relays, each of said first group and said group relays corresponding to one of said subgroups and said groups of said line designations respectively, means comprising an operated one of each of said groups of relays for extending a connection from the one of said lines having the unique designation corresponding to the operated ones of said relays to said selectors, a circuit for operating each of said relays, a plurality of conductors common to said line circuits, each of said conductors corresponding to one of said operating circuits, means for interconnecting each of said operating circuits to the corresponding one of said conductors, a relay in each of said line circuits operative in response to the existence of a calling condition on the corresponding one of said lines, said relay comprising means for operating said interconnecting means, other means operative in response to the operation of any one of said line relays, a calling line identifying circuit comprising the ones of said conductors corresponding to the operating circuits of said line finder relays corresponding to the ones of said lines on which the calling condition exists interconnected by said other means of said line circuit relays for selectively completing the corresponding ones of the operating circuits of said first and said second group line finder relays corresponding to the line on which a calling condition exists.

15. The system set forth in claim 14 wherein said line finder comprises means operative in response to the operation of said conductor interconnecting means for causing said calling line identifying circuit to energize the one of said first group relays corresponding to the calling one of said lines and operative in response to the operation of any one of said first group of relays for causing said calling line identification circuit to energize the one of said second group relays corresponding to the calling one of said lines.

16. The system set forth in claim 14 wherein said relays in each of said groups are arranged in a series and having in addition means comprising chain contacts operative in response to the operation of any one of said relays for opening said operating circuits of the succeeding ones of said series of relays.

17. The system set forth in claim 14 wherein said line finder comprises means operative in response to the operation of said conductor interconnecting means for causing said calling line identifying circuit to energize the one of said first group relays corresponding to the calling one of said lines and operative in response to the operation of any one of said first group relays for causing said calling line identifying circuit to energize the one of said second group relays corresponding to the calling one of said lines, said relays in each of said groups being arranged in a series and having in addition means comprising chain contacts operative in response to the operation of any one of said relays for opening said operating circuits of the succeeding ones of said relays in said series.

References Cited in the file of this patent

UNITED STATES PATENTS

| | | |
|---|---|---|
| 2,562,594 | Bielenberg | July 31, 1951 |
| 2,568,101 | Voss | Sept. 18, 1951 |
| 2,572,266 | Jones | Oct. 23, 1951 |
| 2,708,690 | Mitchell | May 17, 1955 |